(12) United States Patent
Tamagawa

(10) Patent No.: US 6,717,672 B2
(45) Date of Patent: Apr. 6, 2004

(54) COLOR MEASUREMENT METHOD

(75) Inventor: Kiyomi Tamagawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 115 days.

(21) Appl. No.: 09/984,797

(22) Filed: Oct. 31, 2001

(65) Prior Publication Data

US 2002/0071120 A1 Jun. 13, 2002

(30) Foreign Application Priority Data

Oct. 31, 2000 (JP) ........................................ 2000-333157

(51) Int. Cl.$^7$ .................................................. G01J 3/46
(52) U.S. Cl. ........................ 356/402; 356/404; 356/73
(58) Field of Search ........................ 356/73, 402, 404, 356/413, 416

(56) References Cited

U.S. PATENT DOCUMENTS 4,699,510 A  * 10/1987  Alguard ........................ 356/73

FOREIGN PATENT DOCUMENTS

JP          10-176953       6/1998      ............. G01J/3/46

* cited by examiner

*Primary Examiner*—Frank G. Font
*Assistant Examiner*—Layla Lauchman
(74) *Attorney, Agent, or Firm*—Sughrue Mion, PLLC

(57) ABSTRACT

A color measurement method performs a color measurement in which an influence of a fluorescent brightening age included in a printed form is corrected. With respect to the influence of the fluorescent brightening age, a measurement is performed only on a white portion of the printed form. With respect to the color patches constituting a color chart, a correction is performed by a correction quantity in which a reference correction quantity for correcting the influence of the white portion is weighted.

14 Claims, 7 Drawing Sheets

COLOR MEASUREMENT METHOD

BACKGROUND OF THE INVENTION

1. Field of the Invention

The present invention relates to a color measurement method of determining colorimetric values of a measurement object color area on a printed form, typically color patches constituting a color chart on the printed form.

2. Description of the Related Art

Hitherto, it is performed that an input device, for example, a color scanner or an electronic still camera, is used to take an image (hereinafter, it is referred to as an original image) in to obtain image data, so that an reproduced image of the original image is obtained in accordance with the image data by a printing machine or a printer. In this case, there are determined a color reproduction characteristic (profile) associating a color on the original image with a color on the image data, according to the input device, and a color reproduction characteristic (profile) associating a color on the image data with a color on the reproduced image, according to the output device such as a printing machine and a printer, and image data obtained from the original image by the input device is converted into image data suitable for the output device in accordance with both the color reproduction characteristics, so that the reproduced image is outputted in accordance with the image data for the output device. This feature makes it possible to obtain the reproduced image coincident with the original image in color.

The same matter as the above will occur between output devices. Next, there will be explained an example.

Hitherto, when a printing machine is used to perform a color image printing, it is performed that prior to the printing, a color printer and the like is used to create a proof image which is intended to be similar in color to an image to be printed by the printing machine. When the printer creates the proof image, detected are a color reproduction characteristic (a printing profile) describing a relationship between image data and a color of the actual printed matter, associated with a printing machine of interest, and a color reproduction characteristic (a printer profile) describing a relationship between image data and a color of an image to be actually printed, associated with a printer. Image data for printing is converted into image data for printers in accordance with the printing profile and the printer profile, so that a proof image is created in accordance with the image data for printers thus converted. Thus, it is possible to create a proof image that is coincident with the actual printed matter in color.

In order to obtain a proof image that is coincident with the actual printed matter in color in the manner as mentioned above, there is a need to determine with great accuracy color reproduction characteristics (profiles) of the input device and the output device. When the color reproduction characteristics (profiles) are determined, for example, in case of the input device, a color chart, in which color patches are arranged, is read by the input device and then converted into image data, and coordinates (CYMK values, or RGB values) of color spaces (a device color space: for example, a CMYK color space consisting of four colors of cyan (C), magenta (M), yellow (Y) and black (K), or an RGB color space consisting of three colors of red (R), green (G) and blue (B))) on the image data are determined. And the same color chart is measure by a spectrocolorimeter to determine coordinates (L*a*b* values or XYZ values) of a colorimetry color space (for example, L*a*b* color spaces or XYZ color spaces), and the coordinates on the device color space are associated with the coordinates on the colorimetry color space. Thus, it is possible to determine the color reproduction characteristics (profile) of the input device.

When the color reproduction characteristics (profile) of the output device is determined, image data, which corresponds to a color chart wherein color patches are arranged, is created, the output device outputs the color chart in accordance with the image data thus created, the color chart is measured by the spectrocolorimeter, and the coordinates of the color space (the device color space) on the image data are associated with the coordinates of the colorimetry color space. Thus, it is possible to determine the color reproduction characteristics (profile) of the output device.

By the way, a printed form, which includes fluorescent brightening agent to enhance white so that an image looks more beautiful, comes onto the market. In the event that an original image is recorded on a printed form including the fluorescent brightening agent, or in the event that a printing image or a print image is outputted onto the printed form including the fluorescent brightening agent, when a measurement light source used in measurement for colorimetric values of color charts when a profile is produced is different from an observation light source for illuminating images such as an original image, a printing image and a print image when those images are observed, a difference between the measurement light source and the observation light source in emission quantity of the fluorescent brightening agent included in the printed form causes discrepancy in spectral reflectance. Thus, it happens that although there is obtained coincidence in value derived through a color measurement, there is obtained no association in color through the visual observation.

As a method of solving this problem, there is proposed a technology (cf. Japanese Patent Laid Open Gazette Hei. 10-176953) that at the time of color measurement, the color measurement is performed on each of color patches constituting a color chart in two ways according to one of which light of a shortwave is cut and another light of a shortwave is not cut, so that emission quantity of the fluorescent brightening agent is determined and the colorimetric value is correct to meet the observation light source. This method is expressed by formulas as follows.

$$X = X0 + Eil^{*}(X1 - X0)$$
$$Y = Y0 + Eil^{*}(Y1 - Y0)$$
$$Z = Z0 + Eil^{*}(Z1 - Z0) \qquad (1)$$

Where X0, Y0 and Z0 denote XYZ values measured using a measurement light source wherein a short wavelength side is cut, and X1, Y1 and Z1 denote XYZ values measured using a measurement light source wherein a short wavelength side is not cut. Eil denotes an index indicative of the influence by a fluorescent brightening agent, and is expressed by $Eil = E_S/E_L$, where $E_L$ denotes fluorescence excitation intensity on the measurement light source wherein a short wavelength side is not cut, and $E_S$ denotes fluorescence excitation intensity on the observation light source. This Eil is a value, which can be determined beforehand taking the observation light source and the like into consideration.

According to adoption of the above-mentioned former method, it is possible to correct XYZ values obtained through a color measurement to XYZ values obtained through an observation light source.

However, according to the above-mentioned former method, it is necessary to perform twice measurements on each of a plurality of color patches constituting a color chart using the measurement light source wherein a short wavelength side is cut and the measurement light source wherein a short wavelength side is not cut. It is usual that a color chart is constituted of hundreds of color patches arranged. It would take a long time to perform twice measurements on each of such a many color patches, and it is a problem in workability.

SUMMARY OF THE INVENTION

In view of the foregoing, it is an object of the present invention to provide a color measurement method capable of determining colorimetric values corrected in the influence of the fluorescent brightening agent, which are involved in the actual observation, with excellent workability.

To achieve the above-mentioned object, the present invention provides a color measurement method of determining colorimetric values on a colorimetric object color area on a printed form, said color measurement method comprising:

a reference correction quantity obtaining step of determining a reference correction quantity, which is a reference when the colorimetric values on the colorimetric object color area are corrected, the reference correction quantity being associated with a difference between two colorimetric values obtained when a first light and a second light wherein light of a predetermined short wavelength area included in the first light is cut are used to measure a reference color area on the printed form;

a color measurement step of obtaining a first colorimetric value by color measuring the colorimetric object color area using one of the first light and the second light;

a weight obtaining step of measuring a spectral reflection characteristic of at least predetermined short wavelength area of the colorimetric object color area using said one light to determine a weight for correction involved in correction of said first colorimetric value in accordance with said spectral reflection characteristic; and a correction step of correcting said first colorimetric value obtained in said color measurement step in accordance with the reference correction quantity obtained in said reference correction quantity obtaining step and the weight obtained in said weight obtaining step to determine a second colorimetric value.

According to the color measurement method of the present invention, two light sources are used to measure only a reference color area on a printed form so that a reference correction quantity is determined. And with respect to another area (for example, hundreds of color patches), weight and colorimetric value are determined and the colorimetric value is corrected in accordance with the weight and the reference correction quantity. In the color measurement step the colorimetric value is measured, and in the weight obtaining step the spectral reflection characteristic is measured. When the colorimetric value is measured, as a premise, the spectral reflectance is measured. Usually, a colorimeter outputs both the colorimetric value and the spectral reflectance. Thus, in the color measurement step and the weight obtaining step, it is sufficient for both the steps to perform the measurement once. Or alternatively, it is acceptable that only the spectral reflectance is measured and the colorimetric value is determined in the arithmetic unit for performing the correction operation. The "color measurement step" referred to in the present invention includes an aspect of determining the colorimetric value through such a correction operation.

In the color measurement method according to the present invention as mentioned above, it is acceptable that said reference correction quantity obtaining step measures the reference color area on the printed form or another printed form having same characteristics as the former printed form using the first light and the second light so that a third colorimetric value and a fourth colorimetric value are obtained, and determines a value representative of a difference between the third colorimetric value and the fourth colorimetric value, said value being associated with said reference correction quantity.

Simply, in this manner it is possible to determine the reference correction quantity.

Further, in the color measurement method according to the present invention as mentioned above, it is preferable that said reference correction quantity obtaining step comprises:

a first step in which the first light and the second light are used to measure respective reference color areas of a plurality of printed forms having mutually different characteristics, so that a value representative of a difference between a third colorimetric value involved in the first light and a fourth colorimetric value involved in the second light is determined on each of the plurality of printed forms, and said one light adopted in said color measurement step is used to measure a spectral reflection characteristic of at least predetermined short wavelength of the respective reference color areas of the plurality of printed forms, and an index value associated with the value representative of the difference is determined in accordance with the spectral reflection characteristic, so that an association definition representative of an association between the value representative of the difference and the index value; and a second step in which said one light adopted in said color measurement step is used to measure a spectral reflection characteristic of said predetermined short wavelength of the reference color area on the printed form having the colorimetric object color area or another printed form having same characteristics as the former printed form, and the index value according to the spectral reflection characteristic is determined, and the index value thus determined is converted into the value representative of said difference referring to the association definition obtained in said first step so that said reference correction quantity is determined.

According to this feature of the present invention as mentioned above, at only the step of determining the association definition, there is a need to use both the light (the second light) in which the light at the short wavelength side is cut and the light (the first light). However, it is sufficient that this is performed once in a maker side for example, at a preparation step, and in the actual measurement work, it is effective that either one of those two lights is used.

An advantage that the reference correction quantity obtaining step is arranged in the manner as mentioned above resides in the point that as mentioned above, the use of two types of light is performed once in a maker side for example and it is distributed to a number of users. In this case, the reference correction quantity obtaining step paying attention to users can be expressed as follows. That is, it is preferable that said reference correction quantity obtaining step is a step in which said one light adopted in said color measurement step is used to measure a spectral reflection characteristic of at least predetermined short wavelength of the reference color area on the printed form having the colorimetric object color area or another printed form having same characteristics as the former printed form, and the index value according to the spectral reflection characteristic is determined, and the index value thus determined is converted into the reference correction quantity referring to an association definition representative of an association between the index value and the reference correction quantity, said association definition being obtained beforehand.

In this case, it is effective for the measurement that there is prepared only a light source fixed on either one of a light source in which a short wavelength is cut and a light source in which a short wavelength is not cut.

In the color measurement method according to the present invention a mentioned above, it is preferable that said reference correction quantity obtaining step is a step of obtaining the reference correction quantity associated with a difference between two colorimetric values obtained when a white area on the printed form having the colorimetric object color area or another printed form having same characteristics as the former printed form.

According to the present invention, it is permitted to adopt, as the reference color area, for example, a predetermined density of gray of area or the like. However, it is possible to adopt as the reference color area a white area on the printed form, that is, the printed form per se, without preparing such a special area.

In the color measurement method according to the present invention as mentioned above, it is preferable that said weight obtaining step is a step in which a spectral reflectance of at least part of wavelength area of wavelength areas of 500 nm or less is measured and the weight is determined in accordance with the spectral reflectance.

The reason why this is to do so is that the influence of the fluorescent brightening agent appears at areas of 500 nm or less.

In the color measurement method according to the present invention as mentioned above, it is preferable that said weight obtaining step is a step in which the weight is determined in accordance with a product of a predetermined short wavelength area of the spectral reflection characteristic of the colorimetric object color area, said spectral reflection characteristic being obtained through measurement. In this case, it is preferable that said weight obtaining step is a step in which the weight is determined in accordance with a function including a square of said product.

As will be described later, an adoption of such an arithmetic operation makes it possible to suitably determine the weight.

Of the color measurement method according to the present invention as mentioned above, when there is adopted a method in which the above-mentioned association definition is used in the reference correction quantity obtaining step, it is preferable that said reference correction quantity obtaining step is a step in which a spectral reflection characteristic of a predetermined wavelength of 500 nm or less is measured and said index value is determined in accordance with the spectral reflection characteristic. Or alternatively, it is preferable that said reference correction quantity obtaining step is a step in which spectral reflection characteristics of two predetermined wavelengths are measured and a value representative of a difference between the spectral reflection characteristics is determined in form of the index value.

The reason why the index value is determined in accordance with the spectral reflection characteristic of wavelength of 500 nm or less is that the influence of the fluorescent brightening agent appears at areas of 500 nm or less. The reason why a difference between the spectral reflection characteristics is determined in form of the index value is that the difference, for example, a difference between two waves in spectral reflectance or a slant is preferable as the index value.

DETAILED DESCRIPTION OF PREFERRED EMBODIMENTS

Embodiments of the present invention will be described with reference to the accompanying drawings.

Figure 1:
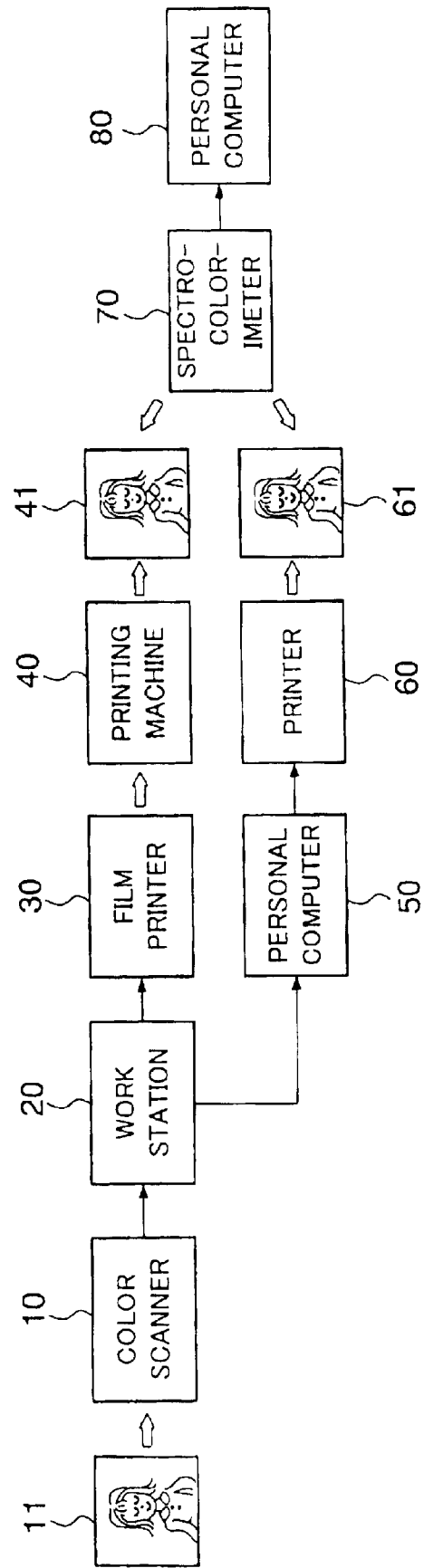
FIG. 1 is a schematic constitution view of a print and proof image creating system to which an embodiment of the present invention is applied.

FIG. 1 is a schematic constitution view of a print and proof image creating system to which an embodiment of the present invention is applied.

A color scanner 10 reads an original image 11 and produces color separation image data of four colors of CMYK representative of the original image 11. The image data of four colors of CMYK is fed to a workstation 20. The workstation 20 performs an electronic page make-up in accordance with image data entered by an operator to create image data representative of an image for printing. The image data for printing is fed, in case of performing printing, to a film printer 30 so that print film original plates for CMYK plates are produced in accordance with the fed image data.

A machine plate is produced from the print film original plate and is mounted on a printing machine 40. Ink is applied to the machine plate mounted on the printing machine 40 and is transferred onto a sheet for print to form a printed image 41 on the sheet.

A series of work, in which the film printer 30 is used to produce the film original plate and further the machine plate, the produced machine plate is mounted on the printing machine 40, and ink is applied to the machine plate to perform a printing on a sheet, is large-scale works and takes a lot of cost. For this reason, before the actual printing works, a printer 60 is used to produce a proof image 61 in accordance with a manner as set forth below, so that a finish of the printed image 41 is confirmed beforehand.

When the proof image is produced, image data, which is created by the electronic page make-up on the workstation 20, is fed to a personal computer 50. Here, the image data fed to the personal computer 50 is description language data described in a so-called PDL (Page Description Language). The personal computer 50 converts the image data of the description language into image data of four colors of CMYK developed to a bit map by a so-called RIP (Raster Image Processor). The image data of four colors of CMYK is substantially the same as the image data for printing fed to the film printer 30.

The image data for printing of four colors of CMYK is converted into image data of four colors of CMYK suitable for a printer 60 through referring to a color conversion definition having a format of LUT (Look Up Table) inside the personal computer 50. The printer 60 receives the image data for the printer of four colors of CMYK and produces the proof image 61 in accordance with the image data for the printer of four colors of CMYK.

A degree of coincidence of colors between the image 41 obtained through printing by the printing machine 40 and the proof image obtained by the printer 60 is determined by the color conversion definition inside the personal computer 50.

A spectrocolorimeter 70 and a personal computer 80, which are shown in FIG. 1, are related to a creation of the color conversion definition.

In this manner, the proof image is produced and confirmed, so that the finish of printing is confirmed beforehand.

An aspect as an embodiment of the present invention in the proof image producing system shown in FIG. 1 resides in processing contents to be executed inside the personal computer 80. Hereinafter, there will be described the personal computer 80.

Figure 2:
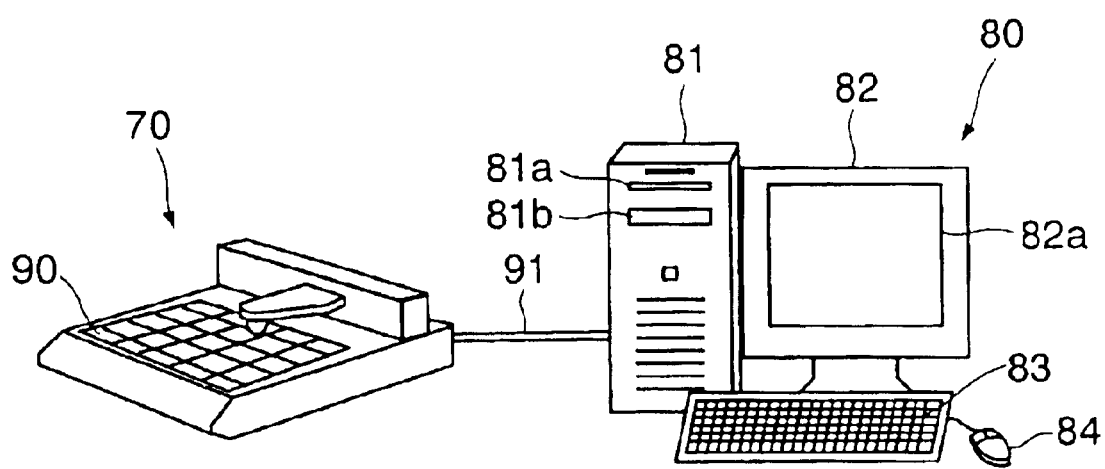
FIG. 2 is a perspective view of a spectrocolorimeter and a personal computer, which are shown in FIG. 1 with blocks.
Figure 3:
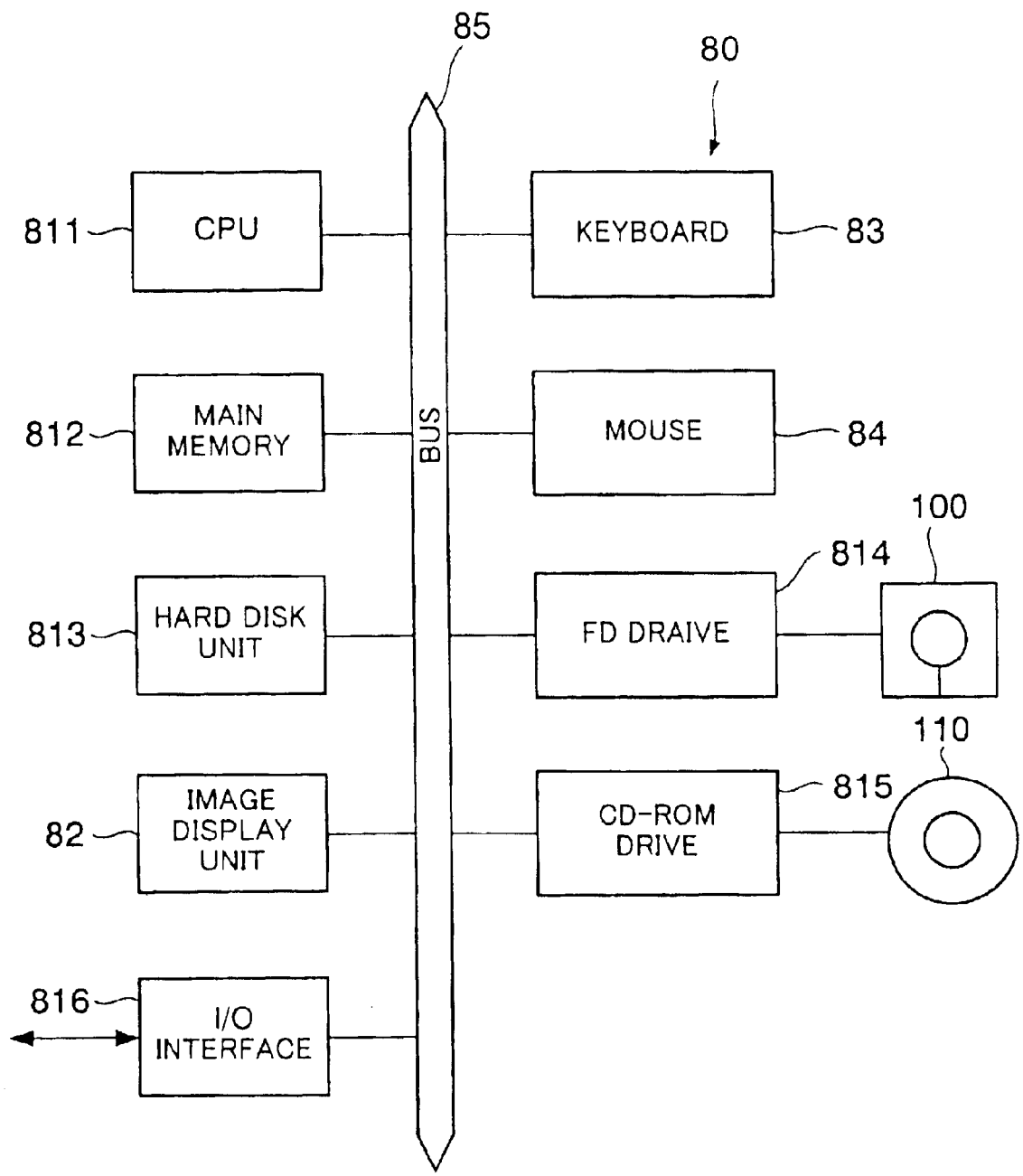
FIG. 3 is a hardware structural view of the personal computer.

FIG. 2 is a perspective view of a spectrocolorimeter 70 and a personal computer 80, which are shown in FIG. 1 with blocks. FIG. 3 is a hardware structural view of the personal computer 80.

A color chart 90, in which a plurality of color patches is arranged, is put on the spectrocolorimeter 70 to measure colorimetric values (here XYZ values) for each of the plurality of color patches constituting the color chart 90. Colorimetric data representative of the colorimetric values for each of the color patches obtained through measurement by the spectrocolorimeter 70 is fed via a cable 91 to the personal computer 80.

The color chart 90 is produced through printing by the printing machine 40 shown in FIG. 1 or through printing out by the printer 60. The personal computer 80 knows color data (coordinates on the device color space; values of CMYK or RGB) associated with the color patches constituting the color chart 90, and produces a printing profile and a printer profile in accordance with color data for the color patches of the color chart 90 and the colorimetric data obtained by the spectrocolorimeter 70. In this respect, the detail description will be described later. Next, there will be described the hardware structure of the personal computer 80.

The personal computer 80 comprises, on an external appearance, a main frame unit 81, an image display unit 82 for displaying an image on a display screen 82a in accordance with an instruction from the main frame unit 81, a keyboard 83 for inputting various sorts of information to the main frame unit 81 in accordance with a key operation, and a mouse 84 for inputting an instruction according to, for example, an icon and the like, through designation of an optional position on the display screen 82a, the icon and the like being displayed on the position on the display screen 82a. The main frame unit 81 has a floppy disk mounting slot 81a for mounting a floppy disk, and a CD-ROM mounting slot 81b for mounting a CD-ROM.

The main frame unit 81 comprises, as shown in FIG. 3, a CPU 811 for executing a various types of program, a main memory 812 in which a program stored in a hard disk unit 813 is read out and developed for execution by the CPU 811, the hard disk unit 813 for saving various types of programs and data, an FD drive 814 for accessing a floppy disk 100 mounted thereon, a CD-ROM drive 815 for accessing a CD-ROM 110 mounted thereon, an I/O interface 816 connected to the spectrocolorimeter 70 (cf. FIG. 1 and FIG. 2), to receive colorimetry data from the spectrocolorimeter 70, and a printer interface 817 to transmit image data to the printer 60. These various types of elements are connected via a bus 85 to the image display unit 82, the keyboard 83 and the mouse 84.

The CD-ROM 110 stores therein a profile creating program for causing the personal computer 80 to operate as a profile creating apparatus. The CD-ROM 110 is mounted on the CD-ROM drive 815 so that the profile creating program, which is stored in the CD-ROM 110, is up-loaded on the personal computer 80 and is stored in the hard disk unit 813.

Next, there will be described a method of creating a color conversion definition constructed in the personal computer 80.

Here, first, a printing profile is produced.

Dot % data for four colors of CMYK from the workstation shown in FIG. 1 are sequentially changed as 0%, 10%, ..., 100%, so that a color chart based on the dot % data thus generated is created in accordance with the above-mentioned printing procedure. While the image 41 shown in FIG. 1 is not an image representative of a color chart, the spectrocolorimeter 70 is used to measure color patches constituting a color chart, it is assumed that the same color chart as the color chart 90 shown in FIG. 2 is printed instead of the image 41. Here, there is a possibility that the printed form, in which the color chart is printed, contains the fluorescent brightening agent, and thus the colorimetric values (XYZ values) obtained through a color measurement by the spectrocolorimeter 70 is corrected in a manner which will be described later. Thus, it is possible to construct a printing profile representative of the association between coordinate values on the color space for four colors of CMYK and coordinate values on the colorimetric color space.

Figure 4:
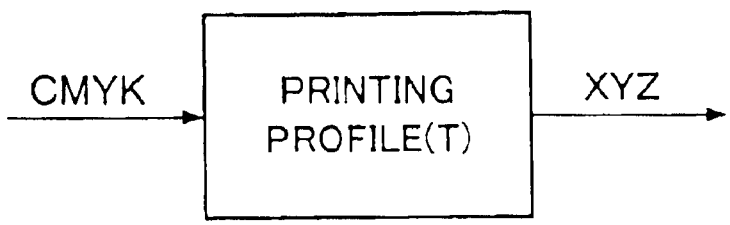
FIG. 4 is a conceptual view of a print profile.

FIG. 4 is a conceptual view of a printing profile.

The printing profile receives image data defined by CMYK, and converts the image data of CMYK into image data defined by XYZ values.

Next, the printer profile is created.

A method of creating the printer profile is the same as the method of creating the printing profile excepting the point that an output device for outputting a color chart is a printer but not a printing machine. That is, the personal computer 50 show in FIG. 1 sequentially changes dot % data for four colors of CMYK as 0%, 10%, 100% for each color, and transmits the dot % data thus generated to the printer 60. The printer 60 outputs the color chart in accordance with the dot % data. While the image 61 shown in FIG. 1 is not an image representative of a color chart, the spectrocolorimeter 70 is used to measure color patches constituting a color chart, assuming that the same type of color chart as the color chart created by printing of the printing machine 40 for creating the printing profile is outputted instead of the image 61. Thus, it is possible to construct a printer profile representative of the association between coordinate values on the color space for four colors of CMYK and coordinate values on the colorimetric color space (XYZ space).

Figure 5:
FIG. 5 is a conceptual view of a printer profile.

FIG. 5 is a conceptual view of a printer profile.

The printer profile receives dot % data for four colors of CMYK and converts the dot % data for CMYK into colorimetry data of XYZ. Here, P denotes a printer profile (a rectification printer profile) for converting the dot % data for CMYK into the colorimetry data of XYZ. $P^{-1}$ denotes a printer profile for converting the colorimetry data of XYZ into the dot % data for CMYK.

While it has been explained that the printer 60 outputs an image in accordance with the dot % data for four colors of CMYK, it is acceptable that a printer, which outputs an image in accordance with data for RGB for example, is used to create a printer profile suitable for the printer in such a manner that the personal computer 50 generates data defined by the RGB space to output a color chart.

However, here, there is explained a case where the printer 60, which outputs an image in accordance with the dot % data for four colors of CMYK, is used.

Figure 6:
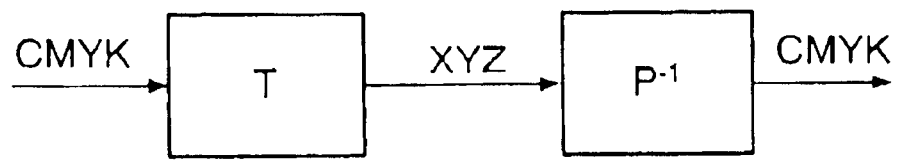
FIG. 6 is a view of a combination profile in which a print profile and a printer profile are combined.

FIG. 6 is a view of a combination profile in which a printing profile and a printer profile are combined.

A printing profile T is used to convert the dot % data for CMYK for printing into colorimetric data of XYZ. Next, the inversion printer profile $P^{-1}$ is used to convert the colorimetry data of XYZ into the dot % data for CMYK for a printer. Thus, it is possible that the printer 60 outputs a proof image, which is the same as printing in color, in accordance with the dot % data for CMYK for printing thus generated. The combination profile, which comprises the printing profile T and the inversion printer profile $P^{-1}$, is a color conversion definition for converting a CMYK color space for printing into a CMYK color space for a printer.

The color conversion definition, as mentioned above, is created by the personal computer 80 constituting the print and proof image creating system shown in FIG. 1, and then is installed in the personal computer 50 constituting the print and proof image creating system shown in FIG. 1. Image data described in PDL, which is fed from the workstation 20, is converted into image data for CMYK, and then the image data for CMYK is converted into image data for CMYK for a printer using the color conversion definition, so that the printer 60 is used to output an image in accordance with the image data for CMYK for a printer, and thereby creating a proof image for an image of printing.

It is not always necessary that the personal computer 80 shown in FIG. 1 creates up to the combination file. It is acceptable that the personal computer 80 creates the printing profile or the printer profile, and the printing profile or the printer profile thus created is fed to the personal computer 50 to create the combination profile.

Next, there will be explained a color measurement method in which influences of the fluorescent brightening agent contained in the printed form is corrected. With respect to the color measurement method of a color chart, there is no difference between a color chart created by printing of a printing machine and a color chart printed out by a printer. Thus here, there will be explained a color measurement method without distinction therebetween.

Figure 7:
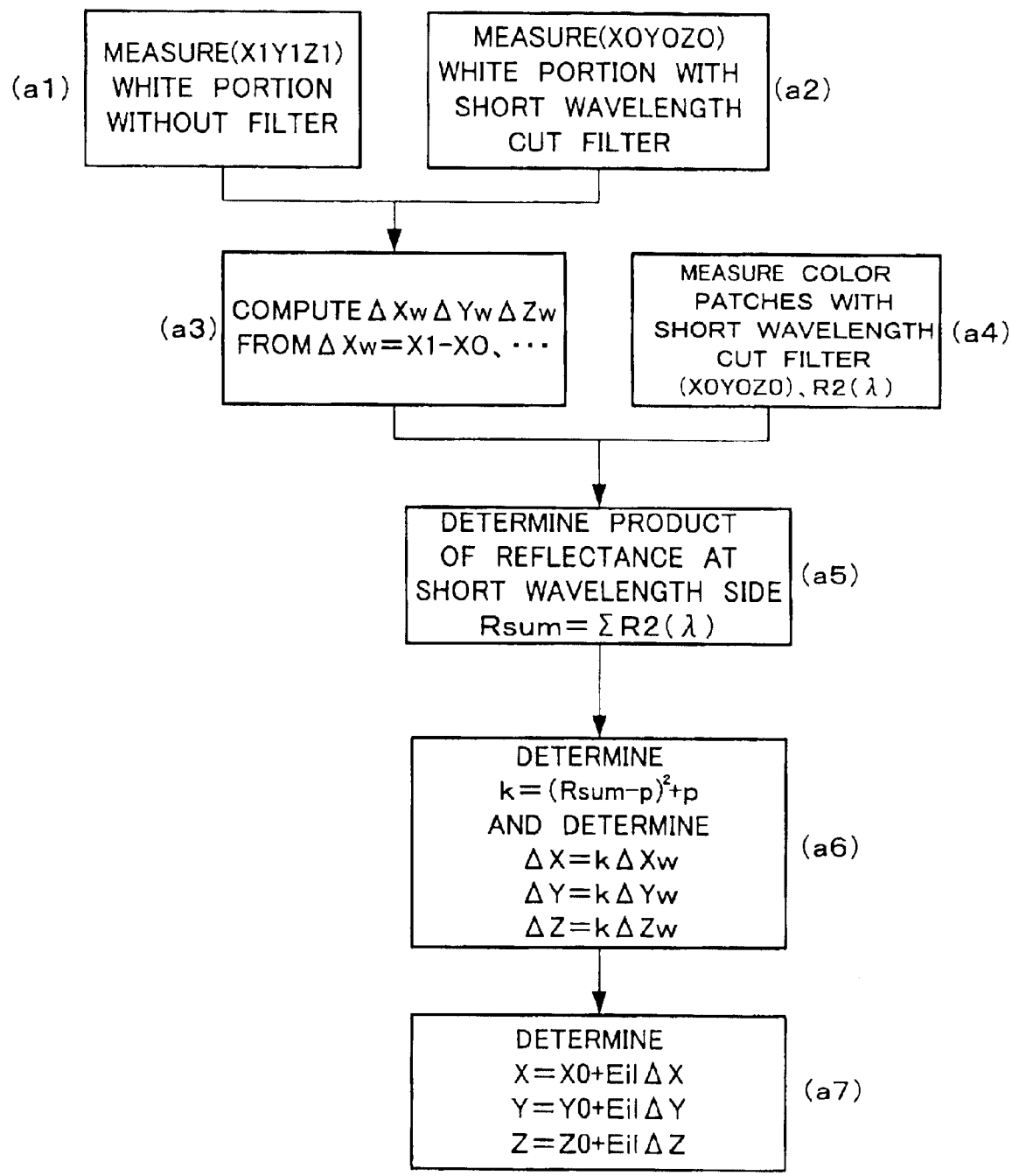
FIG. 7 is a flowchart useful for understanding an embodiment of a color measurement method of the present invention.

FIG. 7 is a flowchart useful for understanding an embodiment of a color measurement method of the present invention.

The spectrocolorimeter 70 shown in FIG. 2 is, for example, such a type of spectrocolorimeter that spectral reflectance of 400 nm–700 nm, which is referred to as JIS level-2, is measured and XYZ values are determined from a result of measurement. The spectrocolorimeter 70 is so arranged that both the spectral reflectance of 400 nm–700 nm and the XYZ values can be outputted.

Here first, with respect to a white portion (a ground color portion of a printed form; an example of a reference color area referred to in the present invention) on the printed form on which the color chart is recorded, XYZ values are measured without a short wavelength cut filter (a step a1), and XYZ values are measured with a short wavelength cut filter (a step a2). This short wavelength cut filter has such a degree of spectral transmission factor distribution that when it is directed from the long wavelength side to the short wavelength side, a part of the wavelength starts in cut in the vicinity of 420 nm, a large part of the wavelength is cut at 400 nm, and almost of all the wavelength is cut at 380 nm or so.

Here, XYZ values measured without short wavelength cut filter are denoted by (X1, Y1, Z1), and XYZ values measured with short wavelength cut filter are denoted by (X0, Y0, Z0).

With respect to the white portion of the printed form measured in the step a1 and the step a2, both XYZ values (X1, Y1, Z1; X0, Y0, Z0) are fed to the personal computer 80 shown in FIG. 2. The personal computer 80 determines color differences therebetween with respect to the white portion of the printed form as follows (a step a3).

$$\Delta Xw = X1 - X0$$

$$\Delta Yw = Y1 - Y0$$

$$\Delta Zw = Z1 - Z0 \tag{2}$$

Those color differences $\Delta X_w$, $\Delta Y_w$ and $\Delta Z_w$ correspond to examples of reference correction quantity referred to in the present invention.

Next, with respect to each of a large number of color patches constituting a color chart recorded on a printed form measured on the white portion, here, colorimetric values (X0, Y0, Z0) and spectral reflectance R2 ($\lambda$) are measured in a state that the short wavelength cut filter is mounted (a step a4). A result of the measurement is fed to the personal computer 80. The personal computer 80 determines the product of the spectral reflectance of the portion of the short wavelength side as follows (a step a5).

$$R_{sum} = \sum_{\lambda} R2(\lambda) \tag{3}$$

Here, the spectral reflectance from $\lambda = 400$ nm to 420 nm is integrated.

Next, the personal computer 80 determines weight k in accordance with the following formula.

$$K = (R_{sum} - p)^2 + p \tag{4}$$

Where p is a constant.
The reason why the weight k is determined in accordance with the formula (4) will be described later. Further, using the weight k, correction quantities of X, Y and Z, which are associated with the respective color patches, are determined in accordance with formulas (5), respectively (a step a6).

$$\Delta X = k \Delta X_w$$

$$\Delta Y = k \Delta Y_w$$

$$\Delta Z = k \Delta Z_w \tag{5}$$

Further, the personal computer 80 corrects the colorimetric values (X0, Y0, Z0), which are measured by the spectrocolorimeter 70 on the respective color patches, in accordance with the following formula (6), and determines the colorimetric values X, Y and Z after correction.

$$X = X0 + Eil * \Delta X$$

$$Y = Y0 + Eil * \Delta Y$$

$$Z = Y0 + Eil * \Delta Z \tag{6}$$

Where Eil denotes, as mentioned above, the index indicative of the influence by the fluorescent brightening agent and is determined beforehand in accordance with the observation light source. When a profile is created adopting the colorimetric value on both the printing profile and the printer profile corrected in the manner as mentioned above, it is possible to obtain a proof image coincident in color with great accuracy under a predetermined observation light source.

Figure 8:
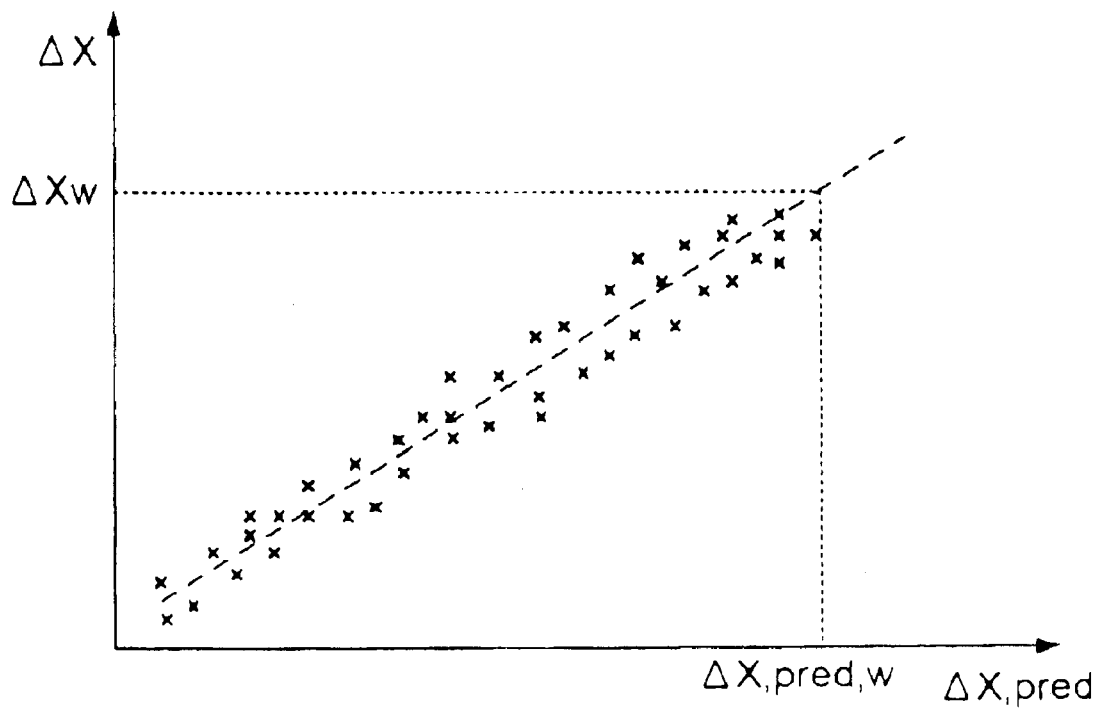
FIG. 8 is an explanatory view as to how weight k is determined.

FIG. 8 is an explanatory view as to how weight k is determined in accordance with the formula (4).

In a graph shown in FIG. 8, a vertical axis denotes an actual correction quantity for each color patch, which is determined on the respective color patch in a similar fashion to that of the above-mentioned former example, and a horizontal axis denotes an estimation value, which is determined in accordance with the following formula (7) using the weight k determined in accordance with the formula (4) and the color differences $\Delta X_w$, $\Delta Y_w$ and $\Delta Z_w$ of the white portion, which are determined in accordance with the formula (2).

$$\Delta X_{pred} = k\Delta X_w$$

$$\Delta y_{pred} = k\Delta Y_w$$

$$\Delta Z_{pred} = k\Delta Z_w \qquad (7)$$

It is noted that FIG. 8 shows only the matter concerning the X value of the XYZ values.

An excitation by the fluorescent brightening agent, which causes shifts ($\Delta X$, $\Delta Y$ and $\Delta Z$) in chromaticity value when the printed form containing the fluorescent brightening agent is used, relates to a reflection light quantity at the short wavelength side. Accordingly, it is considered that there is obtained such a correlation that the larger reflection light quantity brings about the larger excitation quantity so that a shift quantity of chromaticity value becomes large, and the smaller reflection light quantity brings about the smaller excitation quantity so that a shift quantity of chromaticity value becomes small.

In accordance with this basic consideration Applicant sought such a condition that with respect to the relation between the reflection factor R at the short wavelength side and the shift quantity of chromaticity values $\Delta X$, $\Delta Y$ and $\Delta Z$, a correlation with actual measurements of the shift quantity of chromaticity value becomes preferable. As a result, it becomes clear as shown in FIG. 8 that a preferable correlation with actual measurements (vertical axis) can be obtained through determining the estimated values of the shift quantity of chromaticity values: $\Delta X_{pred}$, $\Delta Y_{pred}$ and $\Delta Z_{pred}$ in accordance with the formula (7), that is, $$\Delta X_{pred} = k\Delta X_w$$

$$\Delta y_{pred} = k\Delta Y_w$$

$$\Delta Z_{pred} = k\Delta Z_w \qquad (7)$$

where $\Delta X_w$, $\Delta Y_w$ and $\Delta Z_w$ denote shift quantity of chromaticity values of the white portion using the function of the formula (4), that is, $$k = (R_{sum} - p)^2 + p \qquad (4)$$

where p is a constant
which comprises a square of the product of the reflection factor at the short wavelength side, that is, $$R_{sum} = \int R(\lambda) d\lambda \qquad (8)$$

Thus, the weight k is determined in accordance with this result through the above-mentioned arithmetic operation.

Figure 9:
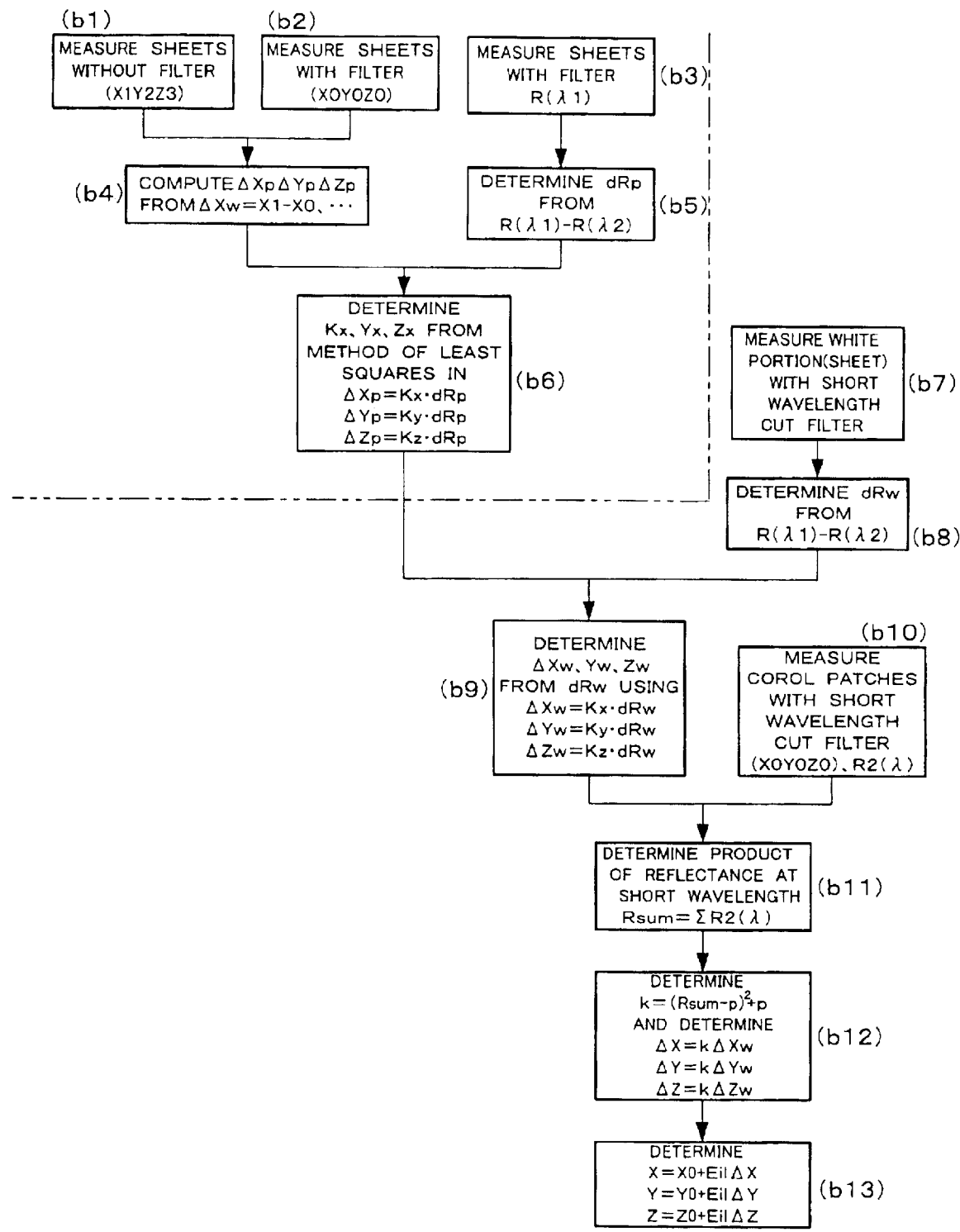
FIG. 9 is a flowchart useful for understanding an alternative embodiment of a color measurement method of the present invention.

FIG. 9 is a flowchart useful for understanding an alternative embodiment of a color measurement method of the present invention. In this embodiment, characteristics of the light source of the spectrocolorimeter 70 (cf. FIG. 2) to be used and characteristics of the short wavelength cut filter are the same as those of the former embodiment.

Here, a plurality of sorts of printed forms, which is deemed to contain the fluorescent brightening agent, is gathered, and the spectrocolorimeter 70 shown in FIG. 2 is used to measure each of the plurality of printed forms without the short wavelength cut filter (colorimetric values X1, Y1, Z1) and with the short wavelength cut filter (colorimetric values X0, Y0, Z0) (steps b1 and b2). In case of the use of the short wavelength cut filter, spectral reflectance $R(\lambda)$ of the plurality of printed forms (or white portion) is measured (a step b3).

Results of the measurement are fed to the personal computer 80 shown in FIG. 2. The personal computer 80 computes the following formula (9) on the plurality of printed forms (a step b4):

$$\Delta X_p = X1 - X0$$

$$\Delta Y_p = Y1 - Y0$$

$$\Delta Z_p = Z1 - Z0 \qquad (9)$$

and determines $$dR_p = R(\lambda 1) - R(\lambda 2) \qquad (10)$$

on the plurality of printed forms (a step b5). Where $R(\lambda 1)$ and $R(\lambda 2)$ denote spectral reflectance of wavelengths $\lambda 1$ and $\lambda 2$, and here $\lambda 1 = 420$ nm and $\lambda 2 = 400$ nm are selected.

$\Delta X_p$, $\Delta Y_p$ and $\Delta Z_p$, which are determined by the formula (9), correspond to an example of values representative of a difference between the third colorimetric value and the fourth colorimetric value referred to in the present invention. $dR_p$ corresponds to an example of an index value referred to in the present invention.

Next, in a step b6, the personal computer 80 determines, using the method of least squares, factors $k_x$, $k_y$ and $k_z$ in $$\Delta X_p = k_x * dR_p$$

$$\Delta Y_p = k_y * dR_p$$

$$\Delta Z_p = k_z * dR_p \qquad (11)$$

The factors $k_x$, $k_y$ and $k_z$ correspond to an example of the association definition representative of the association between the values ($\Delta X_p$, $\Delta Y_p$, $\Delta Z_p$) indicative of difference and the index value ($dR_p$).

Next, the spectrocolorimeter 70 shown in FIG. 2 is used to measure with the short wavelength cut filter spectral reflectance $R_w(\lambda)$ of the white portion of the printed form on which a color chart is recorded (a step b7).

This measurement result is also fed to the personal computer 80 shown in FIG. 2. The personal computer 80 determines the index value $dR_w$ in accordance with the following formula (12) (a step b8)

$$dR_w = R(\lambda 1) - R(\lambda 2) \qquad (12)$$

Here, by way of example, $\lambda 1 = 420$ nm and $\lambda 2 = 400$ nm are selected.

The personal computer 80 further determines chromaticity value shift quantity $\Delta X_w$, $\Delta Y_w$, $\Delta Z_w$ (an example of the reference correction quantity referred to in the present invention) of the white portion of the printed form on which a color chart is recorded, in accordance with the following formula (13) (a step b9).

$$\Delta X_w = k_x * dR_w$$

$$\Delta Y_w = k_y * dR_w$$

$$\Delta Z_w = k_z * dR_w \qquad (13)$$

where $k_x$, $k_y$ and $k_z$ are the factors determined in the step b6, and $dR_w$ is the index value determined in the step b8.

Steps b10 to b13, after the chromaticity value shift quantity $\Delta X_w$, $\Delta Y_w$, $\Delta Z_w$ of the white portion of the printed form are determined, are the same as the steps a4 to a7 in the embodiment explained referring to FIG. 7, respectively. And thus, the redundant explanation will be omitted.

According to the above-mentioned explanation, all the steps b1 to b13 in FIG. 9 are implemented using the spectrocolorimeter 70 and a personal computer 80. It is acceptable, however, that the steps b1 to b6 are implemented, for example, at a maker side of the printer beforehand, and the obtained results are distributed to a user of the printer, and the user side implements the steps b7 to b13. In this case, the user side can use a spectrophotometer on which the short wavelength cut filter, in the embodiment shown in FIG. 9, is fixedly mounted, and in other words, is not detachably mounted.

In the embodiment shown in FIG. 9, while it is acceptable that a plurality of printed forms used for processing of the steps b1 to b6 are mutually different from one another in accordance with a sort of profiles (for example, a printing profile and a printer profile) to be created, it is not always necessary to do so. And it is acceptable that various types of printed form are gathered independently of a sort of profiles to be created.

In the step a4 of the embodiment shown in FIG. 7 and the steps b3, b7 and b10 of the embodiment shown in FIG. 9, the spectral reflectance is measured with the short wavelength cut filter. However, it is acceptable that the spectral reflectance is measured without the short wavelength cut filter.

Further, according to the embodiments shown in FIGS. 7 and 9, the white portion of the printed form is adopted as the reference color area referred to in the present invention. However, it is not always necessary to be the white portion, and it is acceptable to adopt for example a certain density of gray area as the reference color area.

Furthermore, according to the embodiments shown in FIGS. 7 and 9, when the weight k is determined, the formula (3) or the formula (8) is adopted. It is noted, however, that those formulas are experimental expressions, and it is not always necessary to adopt the completely same formulas as those formulas and any one is acceptable, as a method, which may determine a suitable weight.

Still further, according to the embodiments shown in FIGS. 7 and 9, the white portion of the printed form on which a color chart is recorded is adopted as the reference color area referred to in the present invention. However, instead of measurement of the white portion of the printed form on which a color chart is recorded, of course it is acceptable to measure the white portion of another printed form, which is of the same kind as the former printed form, or has the same characteristic.

Still furthermore, according to the embodiments shown in FIGS. 7 and 9, as the spectrocolorimeter, there is adopted such a type of spectrocolorimeter that spectral reflectance of 400 nm–700 nm, which is referred to as JIS level-2, is measured. However, it is not restricted to this, and it is acceptable to adopt such a type of spectrocolorimeter that spectral reflectance of 380 nm–780 nm, which is referred to as JIS level-1, is measured.

Also with respect to the short wavelength cut filter and the spectral reflectance $R(\lambda 1)$ and $R(\lambda 2)$, it is acceptable to select another characteristic and other wavelengths.

Still furthermore, according to the above-mentioned embodiments, there is explained a color measurement method of color measuring a color chart obtained by a printing machine and a color chart printed out by a printer. However, it is noted that the present invention is not restricted in an object of the color measurement and it is acceptable that for example, a color chart, which is one of original images read by the color scanner 10 shown in FIG. 1, is color-measured, or alternatively it is acceptable that an image other than the color chart is selected as an object of the color measurement.

As mentioned above, according to the present invention, it is possible to reduce working time for a color measurement in which influence of fluorescent brightening agent is corrected.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color measurement method of determining colorimetric values on a colorimetric object color area on a printed form, said color measurement method comprising:

a step of obtaining a reference correction quantity, the reference correction quantity being a reference when the colorimetric values on the colorimetric object color area are corrected, and being associated with a difference between two colorimetric values obtained, when a first light and a second light, wherein light of a predetermined short wavelength area included in the first light is cut, are used to measure a reference color area on the printed form;

a step of measuring a first colorimetric value by color measuring the colorimetric object color area using one of the first light and the second light as one light;

a step of measuring a spectral reflection characteristic of at least predetermined short wavelength area of the colorimetric object color area using said one light to determine a weight for correction involved in correction of said first colorimetric value in accordance with said spectral reflection characteristic; and a step of correcting said first colorimetric value in accordance with the reference correction quantity obtained in said reference correction quantity obtaining step and the weight to determine a second colorimetric value.

2. A color measurement method according to claim 1, wherein said reference correction quantity obtaining step further comprises measuring the reference color area on one of the printed form and another printed form having same characteristics as the printed form using the first light and the second light so that a third colorimetric value and a fourth colorimetric value, respectively, are obtained, and determining a first value representative of a difference between the third colorimetric value and the fourth colorimetric value, said first value being associated with said reference correction quantity.

3. A color measurement method according to claim 1, wherein said reference correction quantity obtaining step further comprises:

a first step of using the first light and the second light to measure respective reference color areas of a plurality of printed forms having mutually different characteristics, so that a first value representative of a difference between a third colorimetric value involved with the first light and a fourth colorimetric value involved with the second light is determined on each of the plurality of printed forms, and using said one light to measure a spectral reflection characteristic of at least predetermined short wavelength of the respective reference color areas of the plurality of printed forms, and determining an index value associated with the first value representative of the difference in accordance with the spectral reflection characteristic, so that an association definition is representative of an association between the first value representative of the difference and the index value; and a second step of using said one light to measure a spectral reflection characteristic of said predetermined short wavelength of the reference color area on one of the printed form having the colorimetric object color area and another printed form having same characteristics as the former printed form, and determining the index value according to the spectral reflection characteristic, and converting the index value thus determined into the first value representative of said difference referring to the association definition obtained in said first step so that said reference correction quantity is determined.

4. A color measurement method according to claim 1, wherein said reference correction quantity obtaining step further comprises using said one light to measure a spectral reflection characteristic of at least predetermined short wavelength of the reference color area on the printed form having one of the colorimetric object color area and another printed form having same characteristics as the former printed form, and determining the index value according to the spectral reflection characteristic, and converting the index value thus determined into the reference correction quantity referring to an association definition representative of an association between the index value and the reference correction quantity, said association definition being obtained beforehand.

5. A color measurement method according to claim 1, wherein said reference correction quantity obtaining step further comprises obtaining the reference correction quantity associated with a second difference between two colorimetric values obtained from a white area on one of the printed form having the colorimetric object color area and another printed form having same characteristics as the former printed form.

6. A color measurement method according to claim 1, wherein said step of measuring a spectral reflection characteristic further comprises measuring a spectral reflectance of at least a part of wavelength area of wavelength areas of 500 nm or less and determining the weight in accordance with the spectral reflectance.

7. A color measurement method according to claim 1, wherein said step of measuring a spectral reflection characteristic further comprises determining the weight in accordance with a product of a predetermined short wavelength area of the spectral reflection characteristic of the colorimetric object color area, said spectral reflection characteristic being obtained through measurement.

8. A color measurement method according to claim 7, wherein said step of measuring a spectral reflection characteristic further comprises determining the weight in accordance with a function including a square of said product.

9. A color measurement method according to claim 3, wherein said reference correction quantity obtaining step further comprises measuring a spectral reflection characteristic of a predetermined wavelength of 500 nm or less and determining said index value in accordance with the spectral reflection characteristic.

10. A color measurement method according to claim 4, wherein said reference correction quantity obtaining step further comprises measuring a spectral reflection characteristic of a predetermined wavelength of 500 nm or less and determining said index value in accordance with the spectral reflection characteristic.

11. A color measurement method according to claim 3, wherein said reference correction quantity obtaining step further comprises measuring spectral reflection characteristics of two predetermined wavelengths and determining a value representative of a difference between the spectral reflection characteristics in form of the index value.

12. A color measurement method according to claim 4, wherein said reference correction quantity obtaining step further comprises measuring spectral reflection characteristics of two predetermined wavelengths and determining a value representative of a difference between the spectral reflection characteristics in form of the index value.

13. A color measurement method of determining colorimetric values on a colorimetric object color area on a printed form, said color measurement method comprising:

measuring first colorimetric values of a white portion of the printed form;

measuring second colorimetric values of the white portion with short wavelength cut filter;

calculating color differences between said first and second colorimetric values;

measuring third calorimetric values and spectral reflectance with the short wavelength cut filter, for a color portion;

calculating weight k using a product of the spectral reflectance of a portion of a short wavelength side; and calculating corrected calorimetric values using weight k.

14. A color measurement method according to claim 13, wherein the step of calculating corrected calorimetric values comprises:

determining correction quantities using the weight k; and calculating corrected calorimetric values of the second calorimetric values using the correction quantities and a predetermined index relating to an influence of a fluorescent brightening agent.

* * * * *